United States Patent
Zhang (10) Patent No.: US 9,696,760 B1
(45) Date of Patent: Jul. 4, 2017

(54) ADJUSTING A CONFIGURATION OF A DISPLAY DEVICE

(71) Applicant: Lenovo (Beijing) Limited, Beijing (CN)

(72) Inventor: Xin Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 15/085,303

(22) Filed: Mar. 30, 2016

(30) Foreign Application Priority Data

Dec. 31, 2015 (CN) .......................... 2015 1 1032658

(51) Int. Cl.
*G06F 1/16* (2006.01)
*E05D 11/08* (2006.01)

(52) U.S. Cl.
CPC .......... *G06F 1/1649* (2013.01); *G06F 1/1616* (2013.01); *G06F 1/1641* (2013.01); *G06F 1/1652* (2013.01); *G06F 1/1681* (2013.01); *E05D 11/08* (2013.01); *G06F 1/1624* (2013.01); *G06F 1/1647* (2013.01)

(58) Field of Classification Search
CPC .... G06F 1/1649; G06F 1/1616; G06F 1/1624; G06F 1/1681; G06F 1/1652; G06F 1/1641; G06F 1/1647; E05D 11/08
See application file for complete search history.

(56) References Cited

U.S. PATENT DOCUMENTS

| | | | | |
|---|---|---|---|---|
| 6,222,507 B1 * | 4/2001 | Gouko | .................. | G06F 1/1601 345/1.1 |
| 8,897,005 B2 * | 11/2014 | Huang | ..................... | H05K 7/16 361/679.01 |
| 2003/0043087 A1 * | 3/2003 | Kim | ....................... | G06F 1/1601 345/1.1 |
| 2005/0002158 A1 * | 1/2005 | Olodort | ................. | G06F 1/1616 361/679.15 |
| 2005/0134524 A1 * | 6/2005 | Parker | .................... | G06F 3/1438 345/1.1 |
| 2005/0253775 A1 * | 11/2005 | Stewart | ................. | G06F 1/1616 345/1.1 |
| 2007/0127196 A1 * | 6/2007 | King, Jr. | ............... | G06F 1/1616 361/679.04 |
| 2007/0247798 A1 * | 10/2007 | Scott, II | ................ | G06F 1/1616 361/679.04 |
| 2009/0213035 A1 * | 8/2009 | Edwards | ............... | G06F 1/1616 345/1.3 |
| 2010/0039350 A1 * | 2/2010 | Wakefield | ............. | G06F 1/1616 345/1.3 |
| 2012/0026069 A1 * | 2/2012 | Ohsaki | .................. | G06F 1/1616 345/1.2 |
| 2015/0342068 A1 * | 11/2015 | Su | ......................... | G06F 1/1681 16/354 |
| 2015/0362958 A1 * | 12/2015 | Shang | ................... | G06F 1/1681 361/679.58 |

\* cited by examiner

*Primary Examiner* — Adrian S Wilson
*Assistant Examiner* — Abhishek Rathod
(74) *Attorney, Agent, or Firm* — Kunzler Law Group (57) ABSTRACT

An electronic device is provided to solve the problem of a relatively single form of an electronic device in the prior art. The electronic device comprises: a first main body; a connector; a second main body, being connected to the first main body through the connector, and can perform a first motion operation relative to the first main body via the connector, the second main body can perform a second motion operation along a second path via the connector.

15 Claims, 4 Drawing Sheets

ADJUSTING A CONFIGURATION OF A DISPLAY DEVICE

CROSS-REFERENCE TO RELATED APPLICATIONS

This patent application claims priority to People's Republic of China Patent Application No. 201511032658.1 filed on Dec. 31, 2015, for XIN ZHANG, the entire contents of which are incorporated herein by reference for all purposes.

FIELD

The subject matter disclosed herein relates to a computing device, and in particular to adjusting a configuration of a display of a computing device.

BACKGROUND

Currently, users have very high requirements in regard to the portability of electronic devices, causing the dimensions of electronic devices to become smaller and smaller However, the forms of electronic devices have become relatively singular as the dimensions have become smaller.

SUMMARY

An embodiment according to the subject matter described herein provides an electronic device to resolve the issue of the relatively singular forms of electronic devices.

An embodiment described herein provides an electronic device that includes a main body, a display device that has a first configuration, and a connector that includes a first connecting member coupled to the main body, and a second connecting member coupled to the display device such that the display device is movably coupled to the main body by the connector.

In one embodiment, upon effecting a relative motion of the display device about the main body, the first and second connecting members of the connector mutually cooperate to switch the first configuration of the display device to a second configuration of the display device.

In some embodiments, a first motion operation of the display device along a first path causes a second motion operation of the display device by the connector. In a further embodiment, the first motion operation comprises a rotation operation, and the second motion operation comprises a deformation operation. In certain embodiments, the display device comprises a display area, and wherein the second motion operation of the display device expands a size of the display area.

In one embodiment, the display device comprises a flexible screen configured to transform from a curving state to a flat state by the connector in response to the first motion operation and the second motion operation. In some embodiments, the first connecting member and the second connecting member are in interactive transmission connection such that the first motion operation is performed on the display device by the first connecting member and the second motion operation is performed on the display device by the second connecting member.

In certain embodiments, the display device comprises a first display screen and a second display screen. The first display screen may be connected to the main body by the first connecting member, and the second display screen may be connected to the first display screen by the second connecting member. In a further embodiment, the first connecting member comprises a first transmission portion fixed to the first display screen. The first transmission portion may include a first engagement portion.

In one embodiment, the second connecting member comprises a second transmission portion fixed to the second display screen. The second transmission portion may include a second engagement portion corresponding to and engaging the first engagement portion such that rotation of the first engagement portion in response to rotation of the display device relative to the main body causes the second engagement portion to rotate the second display screen relative to the first display screen. In some embodiments, the first engagement portion comprises a first helical tooth and the second engagement portion comprises a second helical tooth corresponding to the first helical tooth.

In a further embodiment, the first engagement portion comprises a worm gear and the second engagement portion comprises a worm wheel corresponding to the worm gear. In certain embodiments, the second display screen is translatable relative to the first display screen by the second connecting member. In some embodiments, one end of the second connecting member in connection with the first display screen is disposed on a rail of the first display screen such that the second display screen is translatable relative to the first display screen by sliding the second connecting member within the rail.

In various embodiments, the display device further comprises a third display screen connected to the first display screen by a second connector. In one embodiment, the second connector includes a first connecting member connecting the first display screen to the main body, and a second connecting member connecting the third display screen to the first display screen. In some embodiments, the display device further includes a protector disposed on the second display screen and rotatable about the second display screen to a location where a display surface of the second display screen is covered.

A method, in one embodiment, includes providing an information handling device comprising a main body and a display device. A method, in some embodiments, includes providing a connector comprising a first connecting member coupled to the main body, and a second connecting member coupled to the display device, which may be rotatably coupled to the main body by the connector. A method, in certain embodiments, includes effecting a relative motion of the display device about the main body. In such an embodiment, the first and second connecting members of the connector mutually cooperate to switch a first configuration of the display device to a second configuration of the display device.

A method, in some embodiments, includes transmitting a first motion operation of the display device along a first path to a second motion operation of the display device by the connector. The first motion operation may include a rotation operation, and the second motion operation may include a deformation operation. In one embodiment, the first connecting member and the second connecting member are in interactive transmission connection. In such an embodiment, the first motion operation is performed on the display device by the first connecting member and the second motion operation is performed on the display device by the second connecting member.

In one embodiment, the display device includes a first display screen and a second display screen. The first display screen may be connected to the main body by the first connecting member, and the second display screen may be connected to the first display screen by the second connecting member. In some embodiments, the first connecting member comprises a first transmission portion fixed to the first display screen. The first transmission portion may include a first engagement portion.

In one embodiment, the second connecting member comprises a second transmission portion fixed to the second display screen. The second transmission portion may include a second engagement portion corresponding to and engaging the first engagement portion such that rotation of the first engagement portion in response to rotation of the display device relative to the main body causes the second engagement portion to rotate the second display screen relative to the first display screen.

An apparatus, in one embodiment, includes a first connecting member and a second connecting member operably coupled to the first connecting member. In one embodiment, the connecting member is coupled to a first body of an information handling device, and the second connecting member is coupled to a second body of the information handling device such that the second body is movably coupled to the main body. In a further embodiment, upon effecting a relative motion of the second body about the first body, the first and second connecting members are operable to switch a first configuration of the second body to a second configuration of the second body.

In the embodiment of the subject matter disclosed herein, not only can the second body perform the first motion operation relative to the first main body, but can also perform the second motion operation along the second path via the connector, such that the electronic device can present multiple usage forms to meet the individual demands of different users.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

The technical solutions of the subject matter disclosed herein are described in detail below by specific embodiments in conjunction with drawings. It should be understood that the embodiments of the subject matter disclosed herein and specific features in the embodiments are described in detail with respect to the technical solutions of the subject matter disclosed herein, and are not limitation to the technical solutions of the subject matter disclosed herein. The embodiments of the subject matter disclosed herein and those technical features in the embodiments can be combined without conflict.

Referring to FIG. 1 to FIG. 6. In an embodiment of the subject matter disclosed herein, an electronic device, or information handling device, comprises a first main body 10, a connector 20 and a second main body 30. The main body 10, for example, may include a housing of a device, such as a housing for a keyboard, motherboard, memory, etc., of a laptop computer, and the second main body 30 may include a display device such as a laptop display. Wherein, one end of the connector 20 is fixed on the first main body 10, the other end of the connector 20 is fixed on the second main body 30, the second main body 30 is connected with the first main body 10 through the connector 20.

Figure 1:
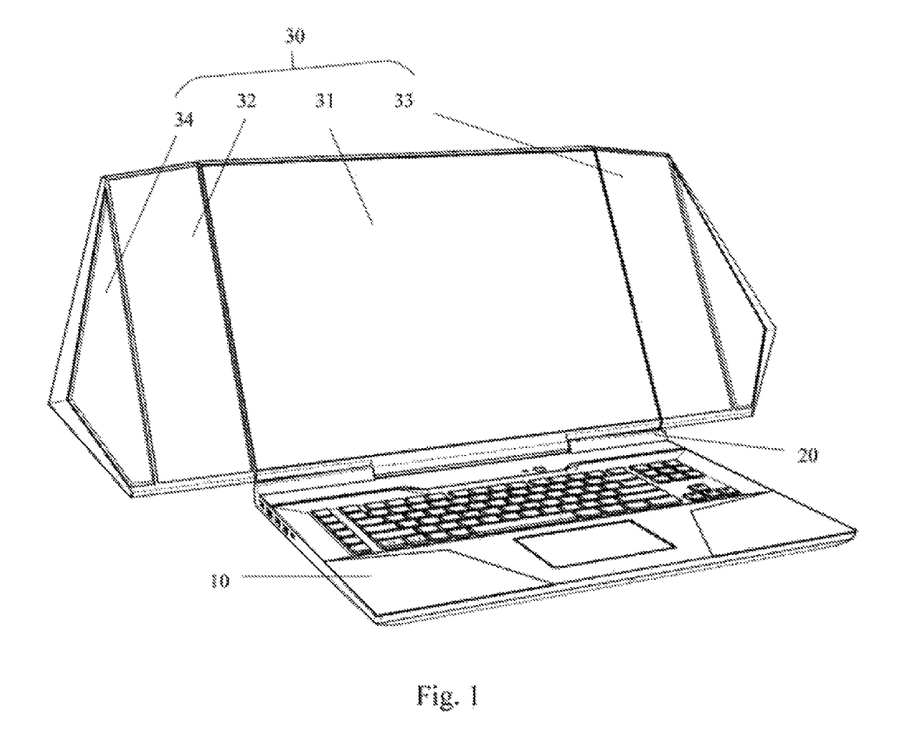
FIG. 1 shows an electronic device according to an embodiment of the subject matter disclosed herein.

The second main body 30 can perform a first rotation operation relative to the first main body 10 via the connector 20, wherein the first rotation operation comprises a rotation operation of the second main body 30 about the first main body 10. For example, opening a laptop computer by lifting the lid of the laptop, e.g., the display device portion of the laptop, and rotating away from the main body 10 of the laptop.

The implementation that the second main body 30 performs the rotation operation about the first main body 10 comprises, but not limited to, the following approaches:

Approach 1: the connector 20 comprises a fixed portion and a movable portion, wherein the fixed portion is disposed on the first main body 10 or the second main body 30, the movable portion is disposed on the other main body, such that the second main body 30 can rotate about the first main body 10, because the movable portion is capable of rotation.

Approach 2: the connector 20 comprises one or more sets of gears for working in conjunction. One end of the gear set is fixed on the first main body 10, the other end thereof is fixed on the second main body 30. When the gear set rotates, the second main body 30 can rotate about the first main body 10.

Approach 3: the connector 20 comprises a rotation portion made from a deformable material. The rotation portion can deform under an acting force, such that the second main body 30 rotates about the first main body 10.

In an embodiment of the subject matter disclosed herein, not only can the second main body 30 perform the first motion operation relative to the first main body 10, but can also perform the second motion operation along a second path via the connector 20. Wherein, the second motion operation can be a deforming operation, such that, for example, the second main body 30 transforms from a folding state to an expansion state, or the second main body 30 transforms from a curving state to a flat state. The second motion operation can also be a rotation operation, such that, for example, the second main body 30 performs a rotation about an axis perpendicular to the first main body 10. The second motion operation can also be a displacement operation, such that, for example, the location of the second main body 30 rises.

In the above described embodiment, not only can the second main body 30 perform the first motion operation relative to the first main body 10, but can also perform the second motion operation along the second path via the connector 20, such that the electronic device can present multiple usage forms to meet the individual demands of different users.

Optionally, in an embodiment of the subject matter disclosed herein, the first motion operation of the second main body 30 along the first path is transmitted to the second motion operation of the second main body 30 by the connector 20.

Specifically, when the second main body 30 performs the first motion operation relative to the first main body 10, the connector 20 will drive the second main body 30 to perform the second motion operation along the second path. In other words, the first motion operation performed by the second main body 30 relative to the first main body 10 and the second motion operation performed by the second main body 30 along the second path are linked.

The specific implementations can be as follows:

The first approach is mechanical driven.

Figure 4:
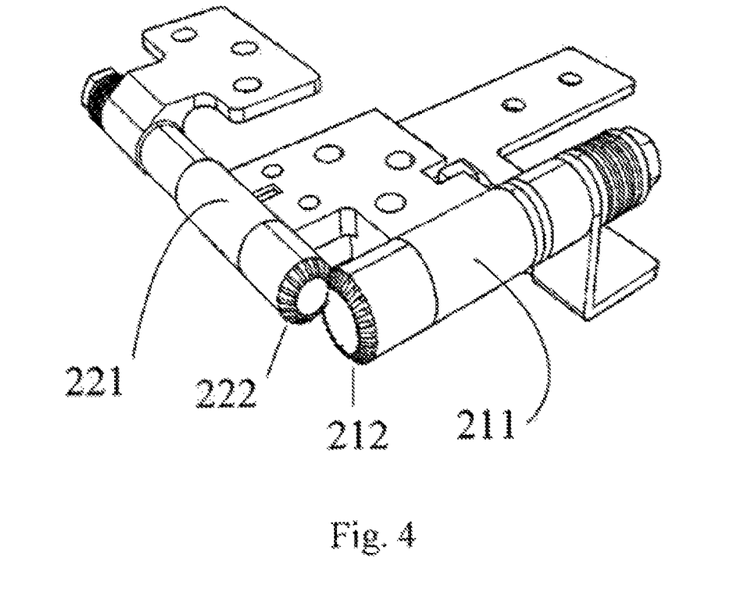
FIG. 4 shows a first connecting member and a second connecting member according to the embodiment of FIG. 1.

The connector 20 comprises a first connecting member 21 and a second connecting member 22 in interactive transmission connection, wherein the second main body 30 can perform the first motion operation via the first connecting member 21, the second main body 30 can perform the second motion operation via the second connecting member 22.

The first connecting member 21 is capable of delivering the motion of the second main body 30 when performing the first motion operation relative to the first main body 10 to the second connecting member 22, such that the second main body 30 is driven to perform the second motion operation along the second path.

Wherein, the first connecting member 21 can be in matching connection with the second connecting member 22, the first connecting member 21 delivers the motion of the first motion operation to the second connecting member 22 directly. The first connecting member 21 can implement a direct motion delivery with the second connecting member 22, and can also implement the indirect motion delivery through an intermediary transmission.

In spite of the direct transmission or the indirect transmission, the transmission approach between the first connecting member 21 and the second connecting member 22 includes, but is not limited to: gear transmission, worm gear transmission, belt transmission, chain transmission, etc.

The second approach is motor driven.

Specifically, the electronic device comprises a motor, being capable of driving the connecting member in the connector 20 for the second main body 30 to perform the second motion operation along the second path. When a processor of the electronic device detects the first motion operation performed by the second main body 30 relative to the first main body 10, the motor is triggered to drive the connecting member, such that the second main body 30 performs the second motion operation along the second path to implement the link between the first motion operation and the second motion operation.

In the above implementation, the connector 20 transmits the first motion operation of the second main body 30 along the first path to the second motion operation of the second main body 30 to implement the link of the second main body 30 between the first motion operation and the second motion operation, greatly enhancing convenience for users of the electronic device.

Optionally, in an embodiment of the subject matter disclosed herein, the second main body 30 comprises a display area. The second motion operation of the second main body 30 is capable of expanding the size of the display area. Specifically, the second main body 30 can be a display screen, or the display screen of the electronic device is disposed on the second main body 30.

In an embodiment of the subject matter disclosed herein, the display screen of the electronic device is capable of being folded or curved. When the second main body 30 performs the second motion operation along the second path, the folded or curved display screen is capable of being expanded (even flattened), such that the size of the display area of the electronic device is expanded.

Figure 3:
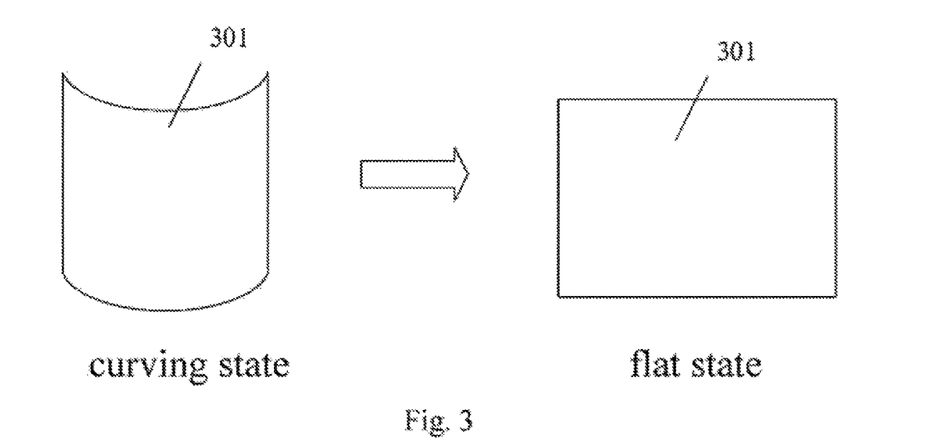
FIG. 3 shows a flexible screen included in a second main body according to the embodiment of FIG. 1.

Refer to FIG. 3. In one implementation, the second main body 30 comprises a flexible screen 301, which can transform from a curving state to a flat state via the connector 20. The driving approach for deforming the flexible screen 301 includes, but is not limited to:

First, its form is changed through a mechanical adjustment means. An acting force for driving the mechanical adjustment means can come from a direct acting force from a user (e.g., the user applies a force onto the flexible screen 301 directly), or from a transmission force of the connector 20 (e.g., the connector 20 transmits the first motion of the second main body 30 about the first main body 10 to the mechanical adjustment means, being driven to change the form of the display screen). The mechanical adjustment means can also be motor driven.

Second, the flexible screen 301 comprises an electro-deformation material, being driven to generate deformation through inletting a default current for the form of the display screen to be changed.

In another implementation, the second main body 30 comprises at least two display screens, being connected through a connecting member, and can rotate about the connecting member between the display screens. An acting force for driving between the display screens can come directly from a user's acting force being acted onto the display screens, and can also be conducted from the first motion of the second main body 30 about the first main body 10, and can come from a driving force of the motor.

In the above technical solution, the display area of the second main body 30 is expanded through the second motion operation of the second main body 30 along the second path to increase an interactive range between the user and the electronic device, extending interactive approach between the user and the electronic device.

Optionally, in an embodiment of the subject matter disclosed herein, the first motion operation is a rotation operation, i.e., an operation of the second main body about the first main body. The second motion operation can be a deformation operation, such as an operation for the shape of an integral second main body to change, or, for example, an operation for a portion of the second main body to move (rotate, translate etc.) relative to another portion thereof.

Optionally, in an embodiment of the subject matter disclosed herein, the connector 20 comprises a first connecting member 21 and a second connecting member 22 in interactive transmission connection, wherein the second main body 30 can perform the first motion operation via the first connecting member 21, and the second main body 30 can perform the second motion operation via the second connecting member 22. Specifically, the first connecting member 21 and the second connecting member 22 can be mutually independent transmission means, or interlinked transmission means.

In an implementation, the first connecting member 21 and the second connecting member 22 are contacted directly for transmitting the motion of the first connecting member 21 to the second connecting member 22, such that the second main body 30 is driven to perform the second motion operation along the second path, so that a mutual link between the first connecting member 21 and the second connecting member 22 is implemented.

In another implementation, the first connecting member 21 and the second connecting member 22 are provided with a power train disposed there between, through which the motion of the first connecting member 21 is delivered to the second connecting member 22, such that the second main body 30 is driven to perform the second motion operation along the second path, so that the mutual link between the first connecting member 21 and the second connecting member 22 is implemented.

When the first connecting member 21 and the second connecting member 22 are linked mutually, the motion can be delivered there between through the following approaches: gear transmission, worm gear transmission, belt transmission, chain transmission, etc.

Figure 2:
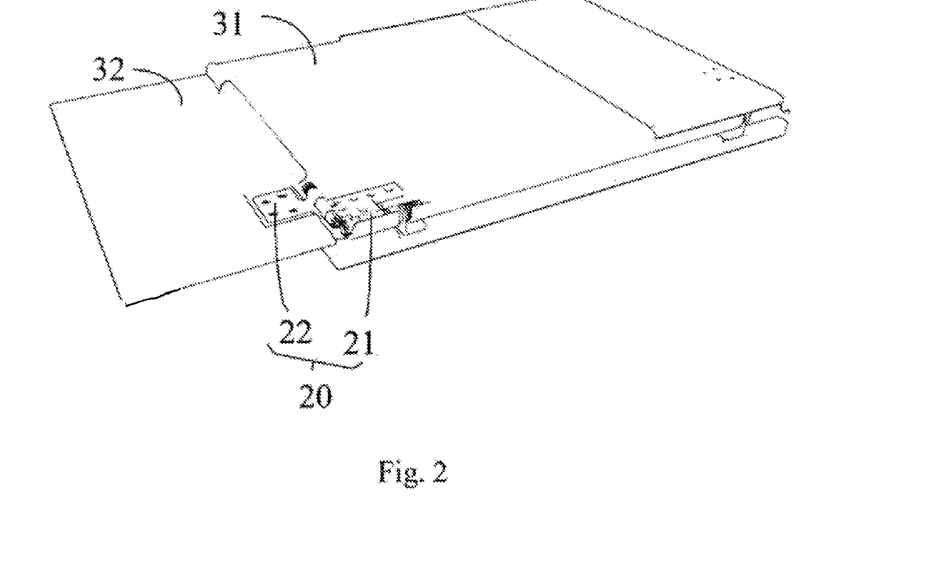
FIG. 2 shows a connection between a first display screen and a second display screen according to the embodiment of FIG. 1.

Optionally, in an embodiment of the subject matter disclosed herein, the second main body 30 comprises a first display screen 31 and a second display screen 32, the first display screen 31 being connected to the first main body 10 through the first connecting member 21, and the second display screen 32 being connected to the first display screen 31 through the second connecting member 22. Wherein, the second display screen 32 can rotate about the first display screen 31 through the second connecting member 22, so that the second motion operation of the second main body 30 is implemented.

The driving force driving the second display screen 32 to rotate about the first display screen 31 can come directly from a user's acting force being acted onto the second display screen 32, and can also be conducted from the first motion of the second main body 30 about the first main body 10, and can come from a driving force of the motor.

Optionally, in an embodiment of the subject matter disclosed herein, the first connecting member 21 comprises a first transmission portion 211 fixed on the first display screen, one end of the first transmission portion 211 being provided with a first engagement portion.

The second connecting member 22 comprises a second transmission portion 221 fixed on the second display screen, one end of the second transmission portion being provided with a second engagement portion matched with the first engagement portion, the first engagement portion being engaged with the second engagement portion, and the first engagement portion can transmit rotation of the first display screen about the first main body to the second engagement portion, driving rotation of the second display screen about the first display screen.

With reference to FIG. 4, in one implementation, the first engagement portion can be a first helical tooth 212, the second engagement portion is a second helical tooth 222 matched with the first helical tooth 212. The first helical tooth 212 can transmit rotation of the first transmission portion 211 to the second helical tooth 222 for driving the second rotation portion to perform a rotation in a direction opposite to the rotation direction of the first transmission portion. In a real situation, both rotation directions of the transmission portions can be perpendicular.

Figure 5:
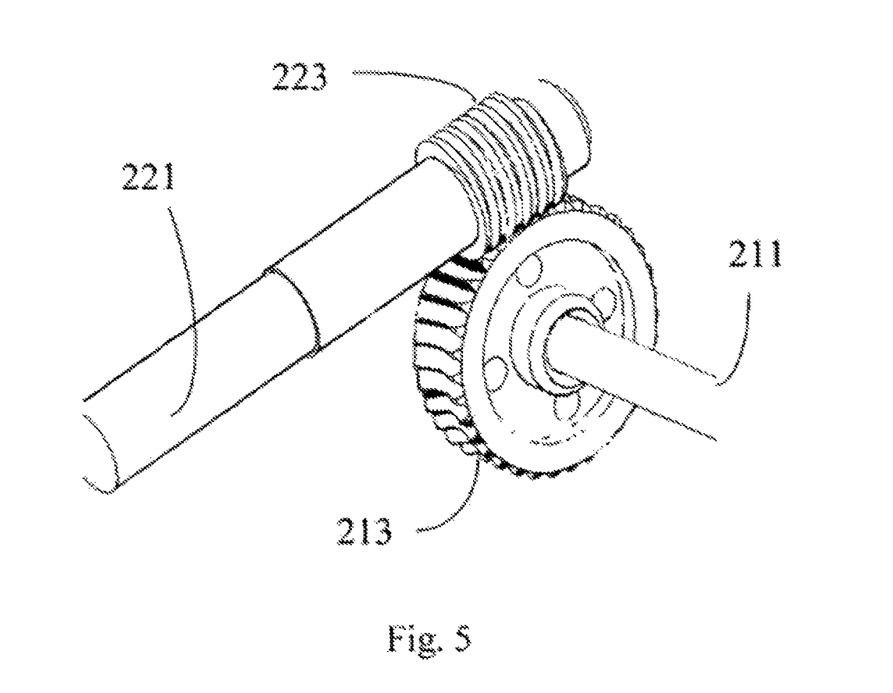
FIG. 5 shows another configuration of the first connecting member and the second connecting member according to the embodiment of the subject matter disclosed herein.

With reference to FIG. 5. In another implementation, the first engagement portion can be a worm wheel 213, the second engagement portion is a worm 223 matched with the worm wheel 213 (or vice versa, the first engagement portion is a worm, the second engagement portion is a worm wheel). The worm wheel 213 mentioned above can deliver the rotation of the first transmission portion 211 to the worm 223 for driving the second rotation portion to perform a rotation in a direction different from the rotation direction of the first transmission portion. In a real situation, both rotation directions can be perpendicular.

In the above technical solution, when the first display screen rotates about the first main body, the first transmission portion fixed on the first display screen performs a rotation accordingly, which in turn, actuates the second engagement portion being engaged with the first engagement portion of the first transmission portion to rotate, such that the second transmission portion is driven to rotate, so that the second transmission portion with the second display screen fixed thereon rotates about the first display screen, achieving the rotation performed by the second display screen about the first display screen when the first display screen rotates about the first main body.

Therefore, the acting force applied by the user for the first display screen to rotate the first main body and open, is also capable of actuating the second display screen to rotate about the first display screen and open. That is, the acting force applied by the user is capable of opening both the first display screen (i.e., the first display screen is at a certain angle from a first main body) and the second display screen (i.e., the second display screen is at a certain angle from the first display screen). The use of the expandable screen, comprising the first display screen and the second display screen, will be very convenient.

Figure 6:
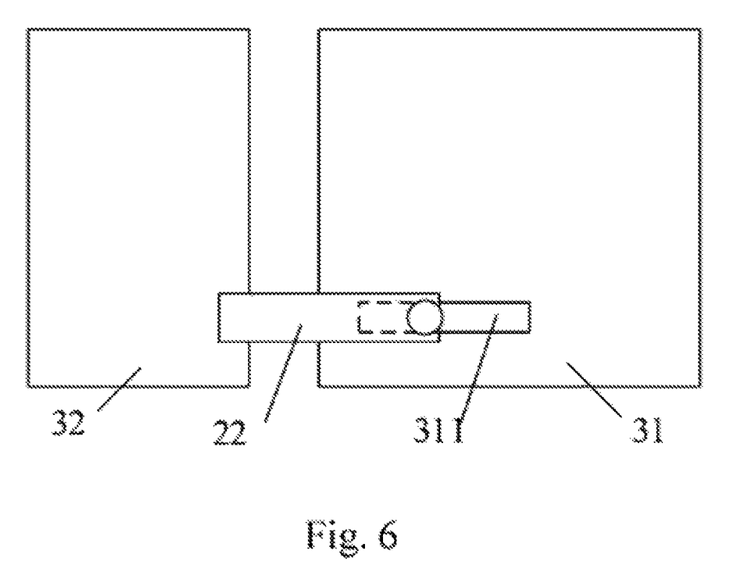
FIG. 6 shows another connection of the first display screen and the second display screen according to the embodiment of the subject matter disclosed herein.

Optionally, in an embodiment of the subject matter disclosed herein, the second display screen can perform a translation operation relative to the first display screen via the second connecting member.

With reference to FIG. 6, in one implementation, one end of the second connecting member 22 in connection with the first display screen 31 is disposed on a rail 311 of the first display screen 31, the second display screen 32 can perform the translation operation relative to the first display screen 31 via the second connecting member 22.

Specifically, the rail 311 of the first display screen 31 can be disposed on a side end of the first display screen 31, and can also be disposed on a back surface or a front surface of the first display screen 31, the second connecting member 22 is disposed on the rail 311, and can slide on the rail 311, while the other end of the second connecting member 22 is fixed on the second display screen 32. Therefore, the translation operation of the second display screen 32 relative to the first display screen 31 can be implemented through the sliding of the second connecting member 22 within the rail 311.

Wherein, the driving force driving the second connecting member 22 to slide in the rail 311 can come directly from the user's acting force being acted onto the second display screen 32, and can also be conducted from the first motion of the second main body 30 about the first main body 10, and can come further from the driving force of the motor. In the latter two approaches mentioned above, the acting force can be conducted to a second connecting element through toothed belt driving, driving the second connecting element to slide within a guide groove.

In an embodiment of the subject matter disclosed herein, other implementations for implementing the translation operation mentioned above further include: regulating a distance between the first display screen and the second display screen with a telescopic fader, accommodating the second display screen in the first display screen, which can be protruded from and pulled back into a chamber through a push-pull mechanism, etc.

In an application scenario of the above technical solution, when the second main body 30 and the first main body 10 are fit together, that is, the angle between the first display screen 31 and the first main body 10 is 0 degrees, the second display screen 32 is fit on the back surface of the first display screen 31. When the angle between the first display screen 31 and the first main body 10 is enlarged, the second display screen 32 is gradually moved out from the back surface of the first display screen 31 toward a lateral side until the display surface of the second display screen 32 is completely moved out of the back surface of the first display screen 31 without being shielded by the first display screen 31. With such an approach, a user can adjust the angle between the first display screen 31 and the first main body 10, change the size of a visible display area of the second display screen 32, and adjust the dimension of the entire display area of the electronic device.

Optionally, in an embodiment of the subject matter disclosed herein, the connector 20 further comprises a third connecting member, the third connecting member and the first connecting member 21 are in interactive transmission connection, the second main body 30 comprises a third display screen 33, being connected to the first display screen 31 through the third connecting member.

Wherein, an implementation of the third connecting member and that of the second connecting member 22 are the same, therefore, the description thereof will not be repeated.

Optionally, in an embodiment of the subject matter disclosed herein, the first display screen 31 is a main display screen of the electronic device, the second display screen 32 and the third display screen 33 are expansion display screens, being disposed on left and right sides of the first display screen 31 symmetrically.

Optionally, in an embodiment of the subject matter disclosed herein, the second main body 30 and the first main body 10 are fit together, that is, when the angle between the first display screen 31 and the first main body 10 is 0 degrees, the second display screen 32 and/or the third display screen 32 are in a fully folding state, that is, the second display screen 32 and/or the third display screen 33 are fit on the front surface or the back surface of the first display screen 31 completely.

Optionally, in an embodiment of the subject matter disclosed herein, when the angle between the first display screen 31 and the first main body 10 reaches a default angle (e.g., 90 degrees), the second display screen 32 and/or the third display screen 33 are in full expansion states, that is, the display surfaces of the second display screen 32 and/or the third display screen 33 and the display surface of the first display screen 31 are on the same plane.

Optionally, in an embodiment of the subject matter disclosed herein, when the angle between the first display screen 31 and the first main body 10 is enlarged, the second display screen 32 and/or the third display screen 33 transform from fully folding states to full expansion states.

Optionally, in an embodiment of the subject matter disclosed herein, the second main body 30 further comprises a protector 34 that is disposed on the second display screen, and can rotate about the second display screen to a location where a display surface of the second display screen is covered.

Specifically, the second display screen 32 is provided with the protector 34 thereon, which can rotate about the second display screen 32. The protector 34 is capable of rotating to a location where the display surface of the second display screen is covered to reduce the probability of damage of the second display screen due to contact with foreign objects.

Optionally, in an embodiment of the subject matter disclosed herein, the third display screen can also be provided with a protector thereon. Optionally, in an embodiment of the subject matter disclosed herein, the protector 34 is provided with a voice output unit or an image acquisition unit thereon.

Optionally, in an embodiment of the subject matter disclosed herein, the first main body comprises a processor connected with the first display screen 31, the second display screen 32, and the third display screen 33 mentioned above through a bus for instructing the above display screens to perform image display.

Optionally, in an embodiment of the subject matter disclosed herein, the processor mentioned above can instruct the first display screen 31, the second display screen 32, and the third display screen 33 to display different areas of the same image, the three display screens being combined together to display an entire image.

Optionally, in an embodiment of the subject matter disclosed herein, the processor mentioned above can instruct the first display screen, the second display screen, and the third display screen to display different image frames (or video streams). In an application scenario, multiple people are in a video call while the above three display screens display the images of different participants.

Optionally, in an embodiment of the subject matter disclosed herein, the first main body 10 further comprises an input unit, such as keyboard, touchpad, microphone, etc. It is to be noted that which is shown in FIG. 1 to FIG. 6 of the attached drawings in the specification are only possible forms of the electronic device, and are not intended to limit the protection scope of embodiments of the subject matter disclosed herein.

In addition, the first display screen 31 and the second display screen 32 marked in FIG. 2 and FIG. 6 can be construed as the back surface or the front surface (i.e., the surface with the display area) of a display screen.

One or more technical solutions provided in the embodiment of the subject matter disclosed herein have at least the following technical effects or advantages:

In the embodiment of the subject matter disclosed herein, not only can the second main body perform the first motion operation relative to the first main body, but can also perform the second motion operation along the second path via the connector, such that the electronic device can present multiple usage forms to meet the individual demands of different users.

Those skilled in the art should understand that the embodiment of the subject matter disclosed herein can be provided as a method, a system or a computer program product. Therefore, the embodiment of the subject matter disclosed herein can be in the form of a full hardware embodiment, a full software embodiment, or an embodiment of a combination of hardware and software. Moreover, the subject matter disclosed herein can be in the form of a computer program product being implemented on one or more computer available storage media (including, but not limited to, disk storage, CD-ROM, optical storage etc.) which comprises computer available program codes.

While preferred embodiments of the subject matter disclosed herein have been described, those skilled in the art can change and modify these embodiments alternatively whenever the basic creative concept is obtained. Thus, the appended claims are intended to be explained as including the preferred embodiments and all changes and modifications within the scope of the subject matter disclosed herein.

Obviously, those skilled in the art can perform various alternations and variations over the subject matter disclosed herein without departing from the spirit and scope of the subject matter disclosed herein. As such, if these modifications and variations of the subject matter disclosed herein fall within the claims of the subject matter disclosed herein and equivalent technologies thereof, the subject matter disclosed herein is also intended to comprise these alternations and variations.

What is claimed is:

1. An electronic device comprising:
    a main body;
    a display device having a first configuration, the display device comprising a first display screen and a second display screen; and
    a connector comprising a first connecting member coupled to the main body, and a second connecting member coupled to the display device, the display device being movably coupled to the main body by the connector, the first display screen being connected to the main body by the first connecting member, and the second display screen being connected to the first display screen by the second connecting member, the first connecting member comprising a first transmission portion fixed to the first display screen, the first transmission portion comprising a first engagement portion, and the second connecting member comprising a second transmission portion fixed to the second display screen, the second transmission portion comprising a second engagement portion corresponding to and engaging the first engagement portion,
    wherein, upon effecting a relative motion of the display device about the main body, the first and second connecting members of the connector mutually cooperate to switch the first configuration of the display device to a second configuration of the display device such that rotation of the first engagement portion in response to rotation of the display device relative to the main body causes the second engagement portion to rotate the second display screen relative to the first display screen.

2. The electronic device of claim 1, wherein a first motion operation of the display device along a first path causes a second motion operation of the display device by the connector.

3. The electronic device of claim 2, wherein the first motion operation comprises a rotation operation, and the second motion operation comprises a deformation operation.

4. The electronic device of claim 3, wherein the display device comprises a display area, and wherein the second motion operation of the display device expands a size of the display area.

5. The electronic device of claim 3, wherein the display device comprises a flexible screen, the flexible screen configured to transform from a curving state to a flat state by the connector in response to the first motion operation and the second motion operation.

6. The electronic device of claim 2, wherein the first connecting member and the second connecting member are in interactive transmission connection, the first motion operation performed on the display device by the first connecting member and the second motion operation performed on the display device by the second connecting member.

7. The electronic device of claim 1, wherein the first engagement portion comprises a first helical tooth and the second engagement portion comprises a second helical tooth corresponding to the first helical tooth.

8. The electronic device of claim 1, wherein the first engagement portion comprises a worm gear and the second engagement portion comprises a worm wheel corresponding to the worm gear.

9. The electronic device of claim 1, wherein the second display screen is translatable relative to the first display screen by the second connecting member.

10. The electronic device of claim 1, wherein one end of the second connecting member in connection with the first display screen is disposed on a rail of the first display screen, the second display screen being translatable relative to the first display screen by sliding the second connecting member within the rail.

11. The electronic device of claim 1, wherein the display device further comprises a third display screen, the third display screen being connected to the first display screen by a second connector, the second connector comprising a first connecting member connecting the first display screen to the main body, and a second connecting member connecting the third display screen to the first display screen.

12. The electronic device of claim 1, wherein the display device further comprises a protector, the protector disposed on the second display screen and rotatable about the second display screen to a location where a display surface of the second display screen is covered.

13. A method comprising:
    providing an information handling device comprising a main body and a display device, the display device comprising a first display screen and a second display screen;
    providing a connector comprising a first connecting member coupled to the main body, and a second connecting member coupled to the display device, the display device being movably coupled to the main body by the connector, the first display screen being connected to the main body by the first connecting member, and the second display screen being connected to the first display screen by the second connecting member, the first connecting member comprising a first transmission portion fixed to the first display screen, the first transmission portion comprising a first engagement portion, and the second connecting member comprising a second transmission portion fixed to the second display screen, the second transmission portion comprising a second engagement portion corresponding to and engaging the first engagement portion; and
    effecting a relative motion of the display device about the main body, the first and second connecting members of the connector mutually cooperating to switch a first configuration of the display device to a second configuration of the display device such that rotation of the first engagement portion in response to rotation of the display device relative to the main body causes the second engagement portion to rotate the second display screen relative to the first display screen.

14. The method of claim 13, further comprising transmitting a first motion operation of the display device along a first path to a second motion operation of the display device by the connector, the first motion operation comprising a rotation operation, and the second motion operation comprising a deformation operation.

15. The method of claim 14, wherein the first connecting member and the second connecting member are in interactive transmission connection, the first motion operation performed on the display device by the first connecting member and the second motion operation performed on the display device by the second connecting member.

* * * * *